United States Patent
Shaik et al.

(10) Patent No.: US 11,954,180 B2
(45) Date of Patent: Apr. 9, 2024

(54) SENSOR FUSION AREA OF INTEREST IDENTIFICATION FOR DEEP LEARNING

(71) Applicant: FORD GLOBAL TECHNOLOGIES, LLC, Dearborn, MI (US)

(72) Inventors: Faizan Shaik, Farmington Hills, MI (US); Medha Karkare, Canton, MI (US); Robert Parenti, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 427 days.

(21) Appl. No.: 17/345,316

(22) Filed: Jun. 11, 2021

(65) Prior Publication Data
US 2022/0398408 A1  Dec. 15, 2022

(51) Int. Cl.
| | | |
|---|---|---|
| G06F 18/25 | (2023.01) |
| G01S 7/41 | (2006.01) |
| G01S 13/86 | (2006.01) |
| G06F 18/211 | (2023.01) |
| G06N 20/00 | (2019.01) |
| G06V 20/59 | (2022.01) |

(52) U.S. Cl.
CPC ............ *G06F 18/253* (2023.01); *G01S 7/417* (2013.01); *G01S 13/867* (2013.01); *G06F 18/211* (2023.01); *G06N 20/00* (2019.01); *G06V 20/593* (2022.01)

(58) Field of Classification Search
CPC ..... G06F 18/253; G06F 18/211; G06N 20/00; G06V 20/593; G01S 7/417; G01S 13/867
See application file for complete search history.

(56) References Cited

U.S. PATENT DOCUMENTS

| | | | |
|---|---|---|---|
| 10,452,946 B2 | 10/2019 | Hotson et al. |
| 2017/0124384 A1 | 5/2017 | Allyn |
| 2017/0282828 A1 | 10/2017 | Carenza et al. |
| 2018/0326944 A1* | 11/2018 | Cech ................. G01S 11/00 |

(Continued)

FOREIGN PATENT DOCUMENTS

CN  107609522 A  1/2018

OTHER PUBLICATIONS

Lee, Jooyoung, et al. "A framework for detecting vehicle occupancy based on the occupant labeling method." Journal of Advanced Transportation 2020 (2020): 1-8. (Year: 2020).*

(Continued)

*Primary Examiner* — Utpal D Shah
(74) *Attorney, Agent, or Firm* — Frank Lollo; Brooks Kushman P.C.

(57) ABSTRACT

Sensor fusion is performed for efficient deep learning processing. A camera image is received from an image sensor and supplemental sensor data is received from one or more supplemental sensors, the camera image and the supplemental sensor data including imaging of a cabin of a vehicle. Regions of interest in the camera image are determined based on one or more of the camera image or the supplemental sensor data, the regions of interest including areas of the camera image flagged for further image analysis. A machine-learning model is utilized to perform object detection on the regions of interest of the camera image to identify one or more objects in the camera image. The objects are placed into seating zones of the vehicle.

16 Claims, 6 Drawing Sheets

(56) References Cited

U.S. PATENT DOCUMENTS

| | | |
|---|---|---|
| 2019/0065878 A1 | 2/2019 | Zeng et al. |
| 2019/0179317 A1 | 6/2019 | Englard et al. |
| 2020/0143182 A1* | 5/2020 | Noh .................. G06V 20/593 |
| 2020/0171977 A1* | 6/2020 | Jales Costa ............ B60N 2/002 |
| 2020/0172048 A1* | 6/2020 | Jo .......................... G06V 10/25 |
| 2021/0001862 A1* | 1/2021 | Senechal .............. G06V 10/764 |

OTHER PUBLICATIONS

Song, Heemang, Youngkeun Yoo, and Hyun-Chool Shin. "In-vehicle passenger detection using FMCW radar." 2021 International Conference on Information Networking (ICOIN). IEEE, 2021. (Year: 2021).*

Kim et al., GRIF Net: Gated Region of Interest Fusion Network for Robust 3D Object Detection from Radar Point Cloud and Monocular Image, Conference Paper, Oct. 2020.

\* cited by examiner

SENSOR FUSION AREA OF INTEREST IDENTIFICATION FOR DEEP LEARNING

TECHNICAL FIELD

Aspects of the disclosure relate to use of a sensor fusion to build active areas of interest for efficient processing of deep learning models.

BACKGROUND

Deep learning models may outperform other machine learning applications in the area of computer vision. Yet, such models may be computationally expensive due to the amount of graphics processing unit (GPU) load and quantity of computations to be performed over the image data. Lowering the resolution of the image may decrease computation time, but the performance of the model correspondingly decreases as well.

SUMMARY

In one or more illustrative examples, a system for performing sensor fusion for efficient deep learning processing is provided. A vehicle has a plurality of seating zones. A computing device of the vehicle is programmed to receive a camera image from an image sensor and a supplemental sensor data from one or more supplemental sensors; determine regions of interest in the camera image based on one or more of the camera image or the supplemental sensor data, the regions of interest including areas of the camera image flagged for further image analysis; utilize a machine-learning model to perform object detection on the regions of interest of the camera image to identify one or more objects in the camera image; and place the objects into the seating zones of the vehicle.

In one or more illustrative examples, a method for sensor fusion is performed for efficient deep learning processing. A camera image is received from an image sensor and supplemental sensor data is received from one or more supplemental sensors, the camera image and the supplemental sensor data including imaging of a cabin of a vehicle. Regions of interest in the camera image are determined based on one or more of the camera image or the supplemental sensor data, the regions of interest including areas of the camera image flagged for further image analysis. A machine-learning model is utilized to perform object detection on the regions of interest of the camera image to identify one or more objects in the camera image. The objects are placed into seating zones of the vehicle.

In one or more illustrative examples, a non-transitory computer-readable medium includes instructions for performing sensor fusion for efficient deep learning processing that, when executed by a computing device, cause the computing device to perform operations including to receive a camera image from an image sensor and a supplemental sensor data from one or more supplemental sensors, the camera image and the supplemental sensor data including imaging of a cabin of a vehicle; determine regions of interest in the camera image based on one or more of the camera image or the supplemental sensor data, the regions of interest including areas of the camera image flagged for further image analysis; utilize a machine-learning model to perform object detection on the regions of interest of the camera image to identify one or more objects in the camera image; and place the objects into seating zones of the vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

It may be desirable for interior sensing features to be developed on smaller GPUs or accelerators while having the same performance as running on a more powerful GPU. To do so without degrading the image resolution and performance of the model, the computation time for execution of a deep learning model may be reduced by generating areas of interest for the model using complementary sensors and algorithms. Complementary sensors, such as radio detection and ranging (RADAR) sensors, may be robust in localizing objects and for providing detection under occlusion conditions may be used to generate areas of interest in the cabin. These areas of interest may be used to focus the operation of the model, reducing GPU usage. Using the model, objects may be identified as being within various areas of interest within the vehicle. This process of identifying the locations of objects may be referred to as placing the identified objects. For instance, persons or things may be placed within seating locations of a vehicle.

Figure 1:
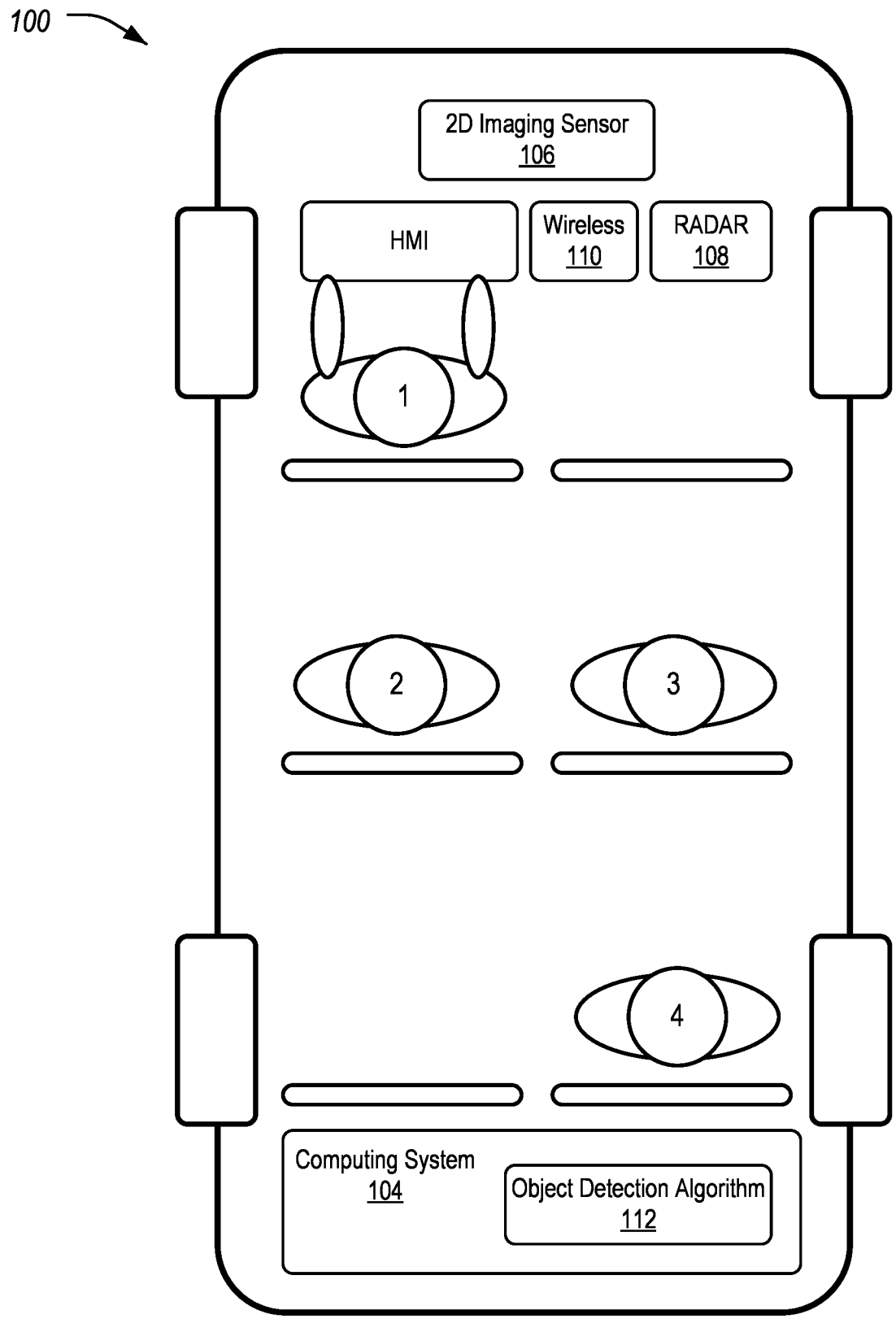
FIG. 1 illustrates an example system including a vehicle for implementing a sensor fusion to build active areas of interest for efficient processing of deep learning models.

FIG. 1 illustrates an example system 100 including a vehicle 102 for implementing a sensor fusion to build active areas of interest for efficient processing of deep learning models. The vehicle 102 may include a computing system 104 configured to provide computing services to the vehicle 102. The vehicle 102 may further include one or more two-dimensional (2D) image sensors 106 configured to capture images of the interior of the cabin of the vehicle 102. The vehicle 102 may also include additional complementary sensors for capturing three-dimensional (3D) information of the cabin of the vehicle 102, such as RADAR sensors 108 and/or wireless transceivers 110. As explained in detail herein, data from the 2D image sensors 106 and complementary sensors may be used to build areas of interest for processing of the imaging from the 2D image sensors 106 by an object detection algorithm 112.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle powered by both an internal combustion engine and one or more electric motors, such as a series hybrid electric vehicle, a parallel hybrid electrical vehicle or a parallel/series hybrid electric vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The vehicle 102 interior may be divided into multiple zones, where each zone is be associated with a seating position within the vehicle 102 interior. For instance, a front row of the illustrated vehicle 102 may include a first seating zone associated with the driver seating position, and a second seating zone associated with a front passenger position. A second row of the illustrated vehicle 102 may a third seating zone associated with a driver-side second-row seating position and a fourth seating zone associated with a passenger-side second-row seating position. A third row of the illustrated vehicle 102 may include a fifth seating zone associated with a driver-side third-row seating position and a sixth seating zone associated with a passenger-side third-row seating position. Variations on the number and arrangement of zones are possible. As some other possibilities, an alternate second row may include three seating zones, or the vehicle 102 may include more or fewer rows.

The computing system 104 may be configured to perform various tasks with respect to monitoring the vehicle 102 cabin. For instance, the computing system 104 may perform occupancy detection to determine which seating zones of the vehicle 102 are occupied. If persons or other objects are identified as being within certain seating zones, this may be referred to as placing those persons or objects into the seating zones. In another example, the computing system 104 may perform driver monitoring to ensure that the driver is attentive to the driving task.

The 2D image sensors 106 may include cameras or other imaging sensors configured to generate 2D image data of the vehicle 102 cabin. In many examples the 2D image data may be stored as a rectangular array of pixels, where each pixel corresponds to a portion of the image. In some examples, the image data may be a single color or channel, forming a single matrix of pixels. In other examples, the image data may be a color image having separate pixel values for multiple color channels, such as red, green, and blue.

The RADAR sensors 108 may be configured to utilize radio waves to determine the range, altitude, direction of movement, and speed of objects. Thus, the RADAR sensors 108 may be configured to provide depth map data of the cabin of the vehicle 102, as well as indications of where movement may be occurring in the vehicle 102.

The wireless transceivers 110 may be configured to provide wireless connectivity to mobile devices in the vehicle 102. Mobile devices may be any of various types of portable computing device, such as cellular phones, tablet computers, smart watches, laptop computers, portable music players, or other devices capable of networked communication with other mobile devices. The wireless transceivers 110 may also be used to detect the locations of the mobile devices within the vehicle 102. For instance, the computing system 104 may use one or more device location-tracking techniques to identify the zone in which any mobile devices are located. In an example, the distance of the target from a reference can be obtained from a measurement of signal strength of the mobile device to wireless antennas located in the cabin of the vehicle 102. For example, received signal strength indicator (RSSI) signal strength information available in the Bluetooth Low-Energy (BLE) protocol may be used to infer the distance of a mobile device from each of a plurality of antennas in the vehicle 102. In another example, ultra-wideband (UWB) signal information may be used to identify the time of flight (ToF) and from that the location of the mobile device.

The object detection algorithm 112 may utilize a machine-learning model, such as a trained neural network, to perform in-cabin object detection. This object detection may include, for example, occupancy detection of seating zones (e.g., determining which seating zones into which persons within the vehicle may be placed). In another example, the object detection may further determine pose, attentiveness, or other aspects of identified individuals within the vehicle 102. In yet a further example, the object detection may include detection of other objects within the vehicle 102, such as animals, toolboxes, electronic devices, other physical objects, etc.

Regardless of specifics, the feature extraction performed by the machine-learning model may be computationally expensive to execute by the computing system 104 due to the amount of GPU load and quantity of computations to be performed over the image. Lowering the resolution of the image may decrease computation time, but the performance of the model correspondingly decreases as well. Nevertheless, it may be desirable for interior sensing features to be developed on smaller GPUs or accelerators while having the same performance as running on a more powerful GPU.

Without degrading the image resolution and performance of the machine-learning model, the computation time may be reduced by generating areas of interest for the machine-learning model using complementary sensors and algorithms, such as the 2D image sensors 106 and RADAR sensors 108.

Figure 2:
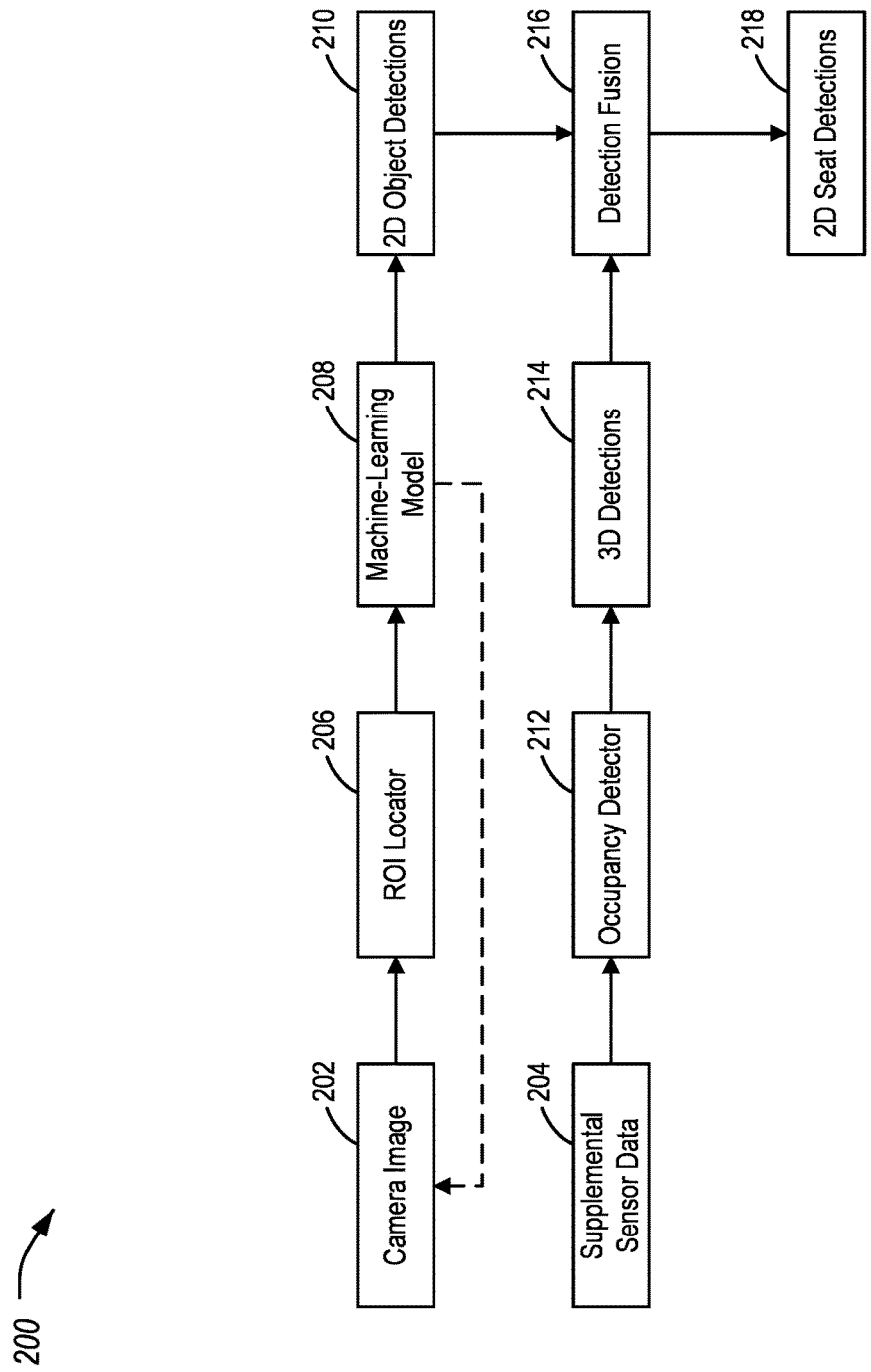
FIG. 2 illustrates a first dataflow for an object detection algorithm using a late sensor fusion with camera-activated regions of interest.

FIG. 2 illustrates a first dataflow 200 for an object detection algorithm 112 using a late sensor fusion with camera-activated ROIs. As shown, a camera image 202 is received from the 2D image sensors 106 for processing by the machine-learning model. Supplemental sensor data 204, such as a RADAR image received from the RADAR sensors 108 and/or RSSI or ToF data received from the wireless transceivers 110 is additionally received for processing by the machine-learning model.

Referring first to the camera image 202, the entire camera image 202 may be passed to a region of interest (ROI) locator 206. The ROI locator 206 may run a background subtraction algorithm to check to see if any objects are located. The ROIs therefore refer to areas of the camera image 202 that are flagged for image analysis. This object location may be done, in an example, per seating zone. If an object is located, the ROI locator 206 may specify a ROI for the object as a region of the camera image 202. The ROI may be a polygonal area of the image in many examples. In a more specific example, the region may be defined as a rectangular area using a tuple such as (x, y, width, height).

If an object is located, the ROI of the object may be passed to a feature extractor of a machine-learning model 208 to detect and classify the located object. The machine-learning model 208 may receive the pixels of the camera image 202 and the specified ROI regions and may perform dimensionality reduction to reduce the input data into fewer, higher level features. For instance, these higher-level features may include indications of the type of located object and/or aspects of the located object (e.g., orientation, pose, attentiveness, etc.). The machine-learning model 208 may output, in an example, 2D object detections 210. These 2D object detections 210 may indicate the locations into which the located objects are placed and other aspects of located object within the vehicle 102 cabin. In an example, the objects may be the faces of individuals within the vehicle 102. In another example, the objects may be the individuals in their entireties. As some other examples, the objects may include animals, toolboxes, electronic devices, or other physical objects.

Referring now to the supplemental sensor data 204, the supplemental sensor data 204 may be used to confirm the location of the objects in the vehicle 102 cabin. For instance, an occupancy detector 212 may receive the supplemental sensor data 204 and, similar to the ROI locator 206 operation on the camera image 202, may identify locations of interest within the supplemental sensor data 204. These locations of interest may include, for example, regions in which motion was detected by the RADAR sensors 108 and/or in which radio frequency broadcast was detected by the wireless transceivers 110. The result of the occupancy detector 212 may include 3D detections 214 of locations within the vehicle 102 at which such occupancy was detected, i.e., where the located objects are placed.

The 2D object detections 210 and the 3D detections 214 may be provided to a detection fusion component 216. In an example, the detection fusion component 216 may fuse the 2D object detection 210 and the 3D detections 214 result based on a weighted function. The weighting may result in 2D seat detections 218, which may take into account both the camera image 202 and the supplemental sensor data 204 to confirm the seat location and/or other aspects of objects in the cabin.

By using the first dataflow 200, the 2D seat detections 218 may be determined while only scanning the camera image 202 once for region proposals by the ROI locator 206. Additionally, the region proposals may be batched for detection via the feature extractor of the machine-learning model 208. Further, simple camera region proposals may be developed based on the stationary interior of the vehicle 102 with respect to the placement of the 2D image sensors 106. Yet further, the GPU memory consumption may be constrained based on batch size.

However, in the first dataflow 200, proposal regions could be missed by the ROI locator 206 due to an incorrect region selection. Additionally, if the ROI locator 206 fails, the machine-learning model 208 may fail to correctly perform the 2D object detections 210.

Figure 3:
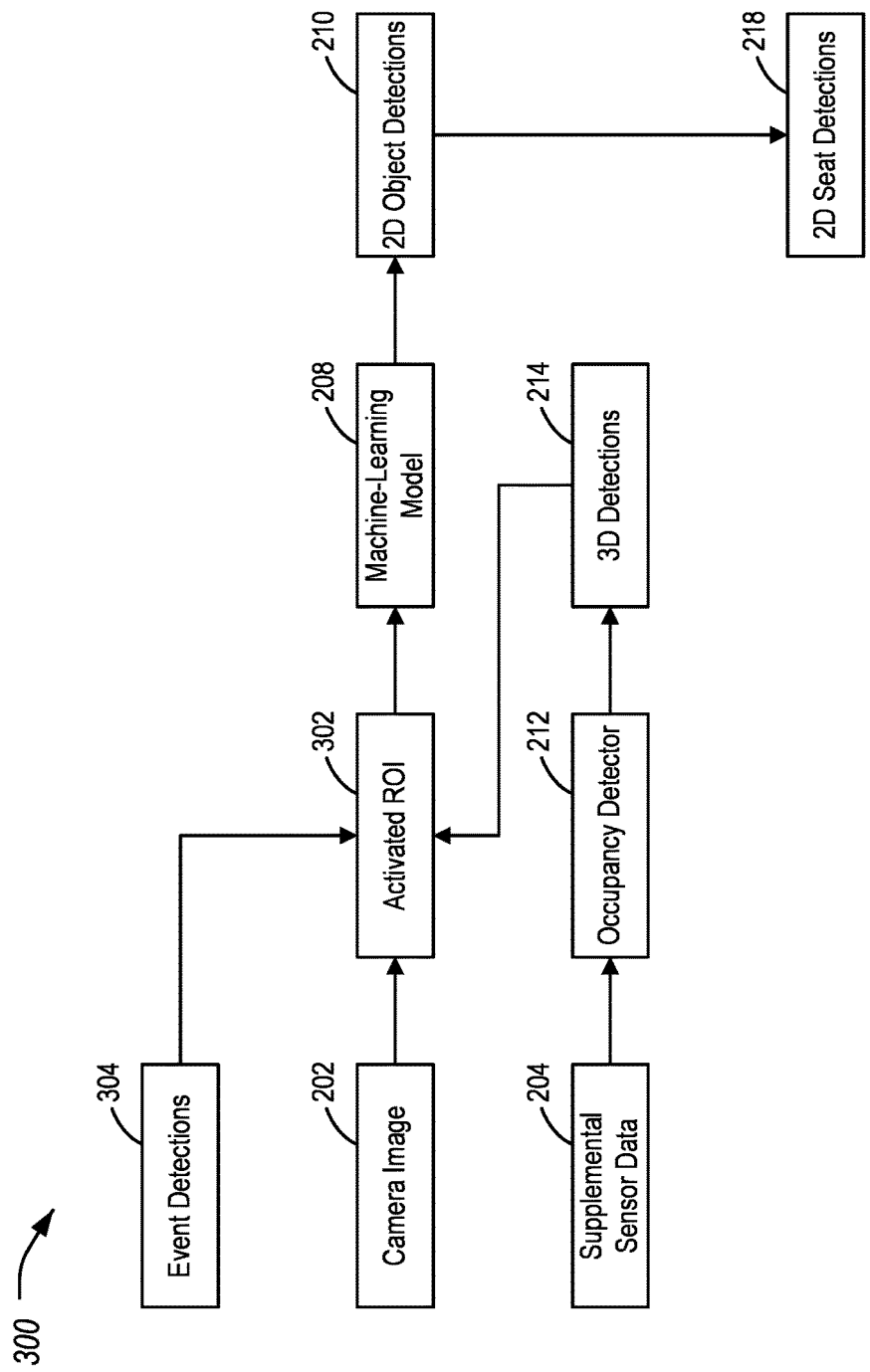
FIG. 3 illustrates a second dataflow for an object detection algorithm using an early sensor fusion with camera-activated regions of interest.

FIG. 3 illustrates a second dataflow 300 for an object detection algorithm using an early sensor fusion with camera-activated ROIs. Similar to the first dataflow 200, a camera image 202 is received from the 2D image sensors 106 for processing by the machine-learning model. Also similar to the first dataflow 200, supplemental sensor data 204, such as a RADAR image received from the RADAR sensors 108 and/or RSSI or ToF data received from the wireless transceivers 110 is additionally received for processing by the machine-learning model.

However, instead of the ROI locator 206 of the first dataflow 200, in the second dataflow 300 an activated ROI locator 302 is substituted instead. As compared to the ROI locator 206, which operates only on the camera image 202 to check to see if any objects are located, the activated ROI locator 302 receives further inputs to improve the location of ROIs. In one example, the activated ROI locator 302 receives the 3D detections 214 from the occupancy detector 212 operating on the supplemental sensor data 204. Thus, the 3D detections 214 may be used by the activated ROI locator 302 in the second dataflow 300 to improve the initial determining of ROIs in the camera image 202 as input to the machine-learning model 208. This is as opposed to using the 3D detections 214 in the first dataflow 200 for fusion by the first dataflow 200 with the 2D object detections 210 after operation of the machine-learning model 208 on the camera image 202. The activated ROI locator 302 may receive additional inputs as shown in the second dataflow 300, such as event detections 304. The event detections 304 may include, for example, location detection of radio transmissions from the wireless transceivers 110.

Thus, the complementary sensors such as RADAR sensors 108 and wireless transceivers 110 in the second dataflow 300 may be run to detect the presence of any object in the cabin. The 3D areas of the object may be projected into camera space as the ROIs interests are created. The ROIs may then be batched together and given as a single input to the machine-learning model 208 for detection and classification.

Using the second dataflow 300, the ROIs are generated using 3D detections or event triggers. As such, the entire camera image 202 is not scanned, only the ROIs of the camera image 202 are scanned. Moreover, in the second dataflow 300 the region proposals can be batched before being sent to the model. This may reduce GPU read/write time access as well as reduce GPU memory usage.

However, as the proposals are generated from the supplemental sensor data 204 from the RADAR sensors 108, it may be possible to miss potential proposals. If the RADAR-based detection fails, then the object detection algorithm 112 may also fail. Further, the second dataflow 300 may lack in time efficiently.

Figure 4:
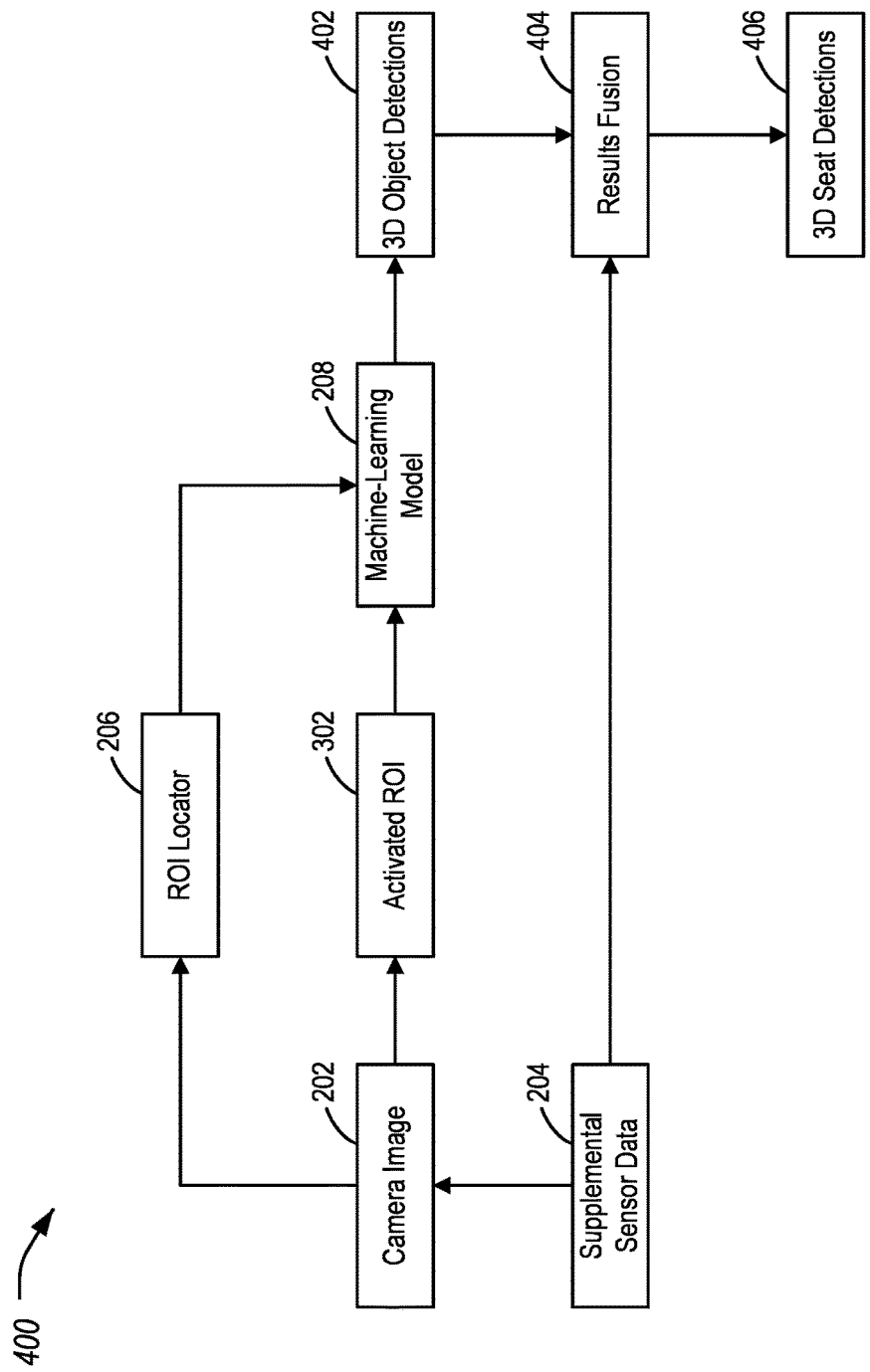
FIG. 4 illustrates a third dataflow for an object detection algorithm using a multi-threaded hybrid fusion of camera image and supplemental sensor data.

FIG. 4 illustrates a third dataflow 400 for an object detection algorithm using a multi-threaded hybrid fusion of camera image 202 and supplemental sensor data 204. Also similar to the first dataflow 200 and second dataflow 300, a camera image 202 is received from the 2D image sensors 106 for processing by the machine-learning model. One again similar to the first dataflow 200 and second dataflow 300, supplemental sensor data 204, such as a RADAR image received from the RADAR sensors 108 and/or RSSI or ToF data received from the wireless transceivers 110 is additionally received for processing by the machine-learning model.

However, as compared to the first dataflow 200 and second dataflow 300, in the third dataflow 400, both the ROI locator 206 of the first dataflow 200 and also the activated ROI locator 302 of the second dataflow 300 are used to identify ROIs. The outputs of both the ROI locator 206 and the activated ROI locator 302 are provided to the machine-learning model 208. The machine-learning model 208 then performs 3D object detections 402 instead of 2D object detections 210 as the machine-learning model 208 additionally receives 3D information based on the camera image 202 and the supplemental sensor data 204.

In an example, two threads may be spawned to generate the ROIs. A first thread may be used to execute the ROI locator 206 to generate un-active ROIs per seating zone using the camera image 202. The un-active area of interests may be created using a geometric model of the 3D cabin of the vehicle 102 and re-projecting those areas in camera space. A second thread may use the 3D detections 214 as discussed in the second dataflow 300 to generate active ROIs. The active areas of interest may be generated by the object detection process for the supplemental sensor data 204, e.g., via the RADAR sensors 108 processing for motion.

The areas of interests from both the ROI locator 206 and the activated ROI locator 302 may be batched and sent as input to the machine-learning model 208 for object detection and classification. The results from the machine-learning model 208 may be fused with the supplemental sensor data 204 using a weighted cost function. Thus, similar to the first dataflow 200, in the third dataflow 400 the 3D detections 214 and the supplemental sensor data 204 are provided to a results fusion components 404 that weights both the 3D detections 214 and the supplemental sensor data 204 to determine 3D detections 406.

Using the third dataflow 400, activated ROIs may be generated using 3D detections but other ROIs are also generated. The entire camera image 202 is not scanned and only ROIs are scanned, but all region proposals can be batched before sending it to the machine-learning model 208. This can reduce GPU read/write time access and GPU memory usage.

However, proposals are only generated using supplemental sensor data 204 such as RADAR. If the RADAR-based detection fails, then the object detection algorithm 112 may also fail. Further, the third dataflow 400 may lack in time efficiently.

Figure 5:
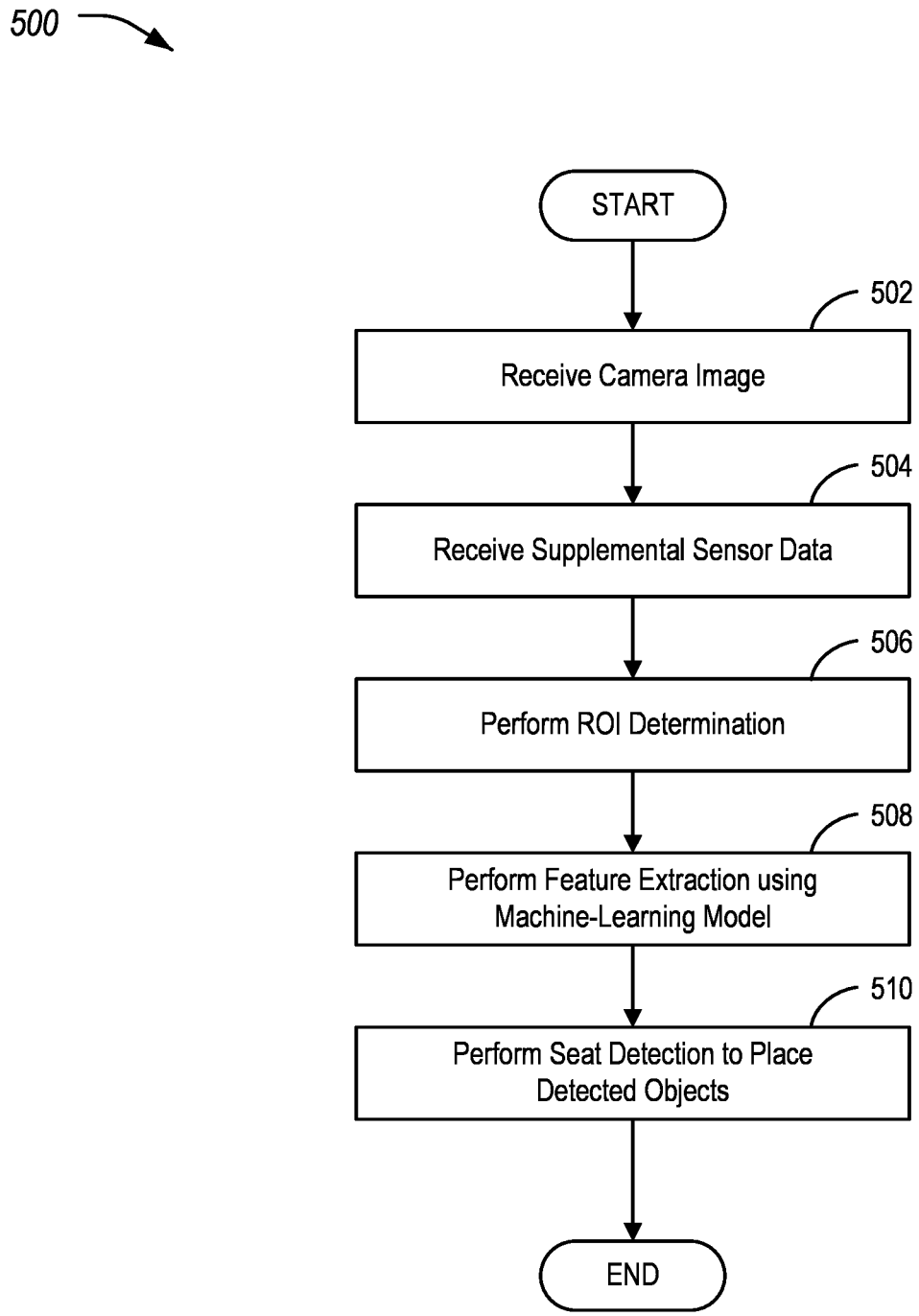
FIG. 5 illustrates an example process for implementing the sensor fusion to build active areas of interest for efficient processing of deep learning models.

FIG. 5 illustrates an example process 500 for implementing the sensor fusion to build active areas of interest for faster or otherwise more efficient processing of deep learning models. In an example the process 500 may be performed by the computing system 104 of the vehicle 102, in the context of the system 100

At operation 502, the computing system 104 receives a camera image 202. In an example, the computing system 104 may receive the camera image 202 from the 2D image sensors 106 in the cabin of the vehicle 102.

At operation 504, the computing system 104 receives supplemental sensor data 204. In an example, the computing system 104 may receive RADAR supplemental sensor data 204 from the RADAR sensors 108 in the cabin of the vehicle 102. In another example, the computing system 104 may receive wireless supplemental sensor data 204 from the wireless transceivers 110 in the cabin of the vehicle 102.

At operation 506, the computing system 104 performs a ROI determination. In an example, the computing system 104 uses the ROI locator 206 as discussed with respect to the first dataflow 200 using a late sensor fusion with camera-activated ROIs. In another example, the computing system 104 uses the activated ROI locator 302 as discussed with respect to the second dataflow 300 using an early sensor fusion with camera-activated ROIs. In yet another example, the computing system 104 uses both the ROI locator 206 and the activated ROI locator 302 as discussed with respect to the third dataflow 400 using a multi-threaded hybrid fusion of camera image 202 and supplemental sensor data 204.

At operation 508, the computing system 104 performs feature extraction using the machine-learning model 208. The machine-learning model 208 may receive the pixels of the camera image 202 and the specified ROI regions and perform dimensionality reduction to reduce the input data into fewer, higher level features. For instance, these higher-level features may include indications of the type of located object, and/or aspects of the located object, e.g., orientation, pose, attentiveness, etc. The machine-learning model 208 may output, in an example, 2D object detections 210. In another example, the machine-learning model 208 may further receive supplemental sensor data 204, such as from the RADAR sensors 108 as discussed in the third dataflow 400, to output the 3D object detections 402.

At operation 510, the computing system 104 performs seat detection. In an example, as shown in the first dataflow 200, the computing system 104 utilizes the detection fusion component 216 to fuse the 2D object detection 210 and the 3D detections 214 result based on a weighted function to result in the 2D seat detections 218. In another example, as shown in the second dataflow 300, the computing system 104 projects 3D areas of the object into camera space as the ROIs interests are created, and therefore avoids fusing 2D and 3D data after the machine-learning model 208 when generating the 2D seat detections 218. In yet a further example, as shown in the third dataflow 400, the computing system 104 utilizes the results fusion components 404 to fuse the 3D object detections 402 and the supplemental sensor data 204 based on a weighted function to result in the 3D detections 406. Regardless of approach, the located persons or other objects may be placed into the seating zones. After operation 510, the process 500 ends.

Figure 6:
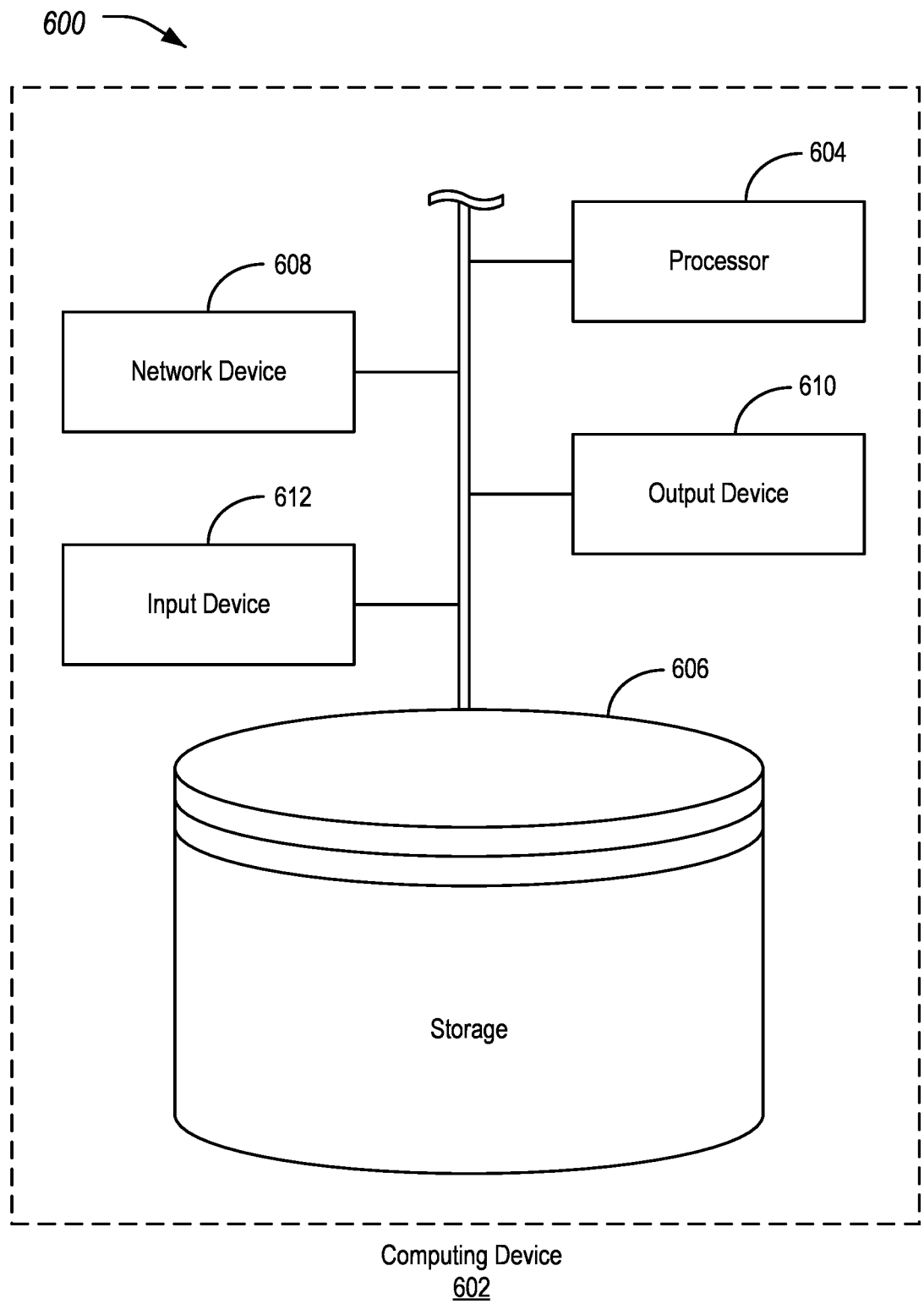
FIG. 6 illustrates an example of a computing device for use implementing the sensor fusion to build active areas of interest for efficient processing of deep learning models.

FIG. 6 illustrates an example 600 of a computing device 602 for use implementing the sensor fusion to build active areas of interest for faster processing of deep learning models. Referring to FIG. 6, and with reference to FIGS. 1-5, the computing system 104 may be an example of such a computing device 602. As shown, the computing device 602 may include a processor 604 that is operatively connected to a storage 606, a network device 608, an output device 610, and an input device 612. It should be noted that this is merely an example, and computing devices 602 with more, fewer, or different components may be used.

The processor 604 may include one or more integrated circuits that implement the functionality of a central processing unit (CPU) and/or GPU. In some examples, the processors 604 are a system on a chip (SoC) that integrates the functionality of the CPU and GPU. The SoC may optionally include other components such as, for example, the storage 606 and the network device 608 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 604 executes stored program instructions that are retrieved from the storage 606. The stored program instructions, accordingly, include software that controls the operation of the processors 604 to perform the operations described herein. The storage 606 may include both non-volatile memory and volatile memory devices. The non-volatile memory includes solid-state memories, such as negative-AND (NAND) flash memory, magnetic and optical storage media, or any other suitable data storage device that retains data when the system 100 is deactivated or loses electrical power. The volatile memory includes static and dynamic random-access memory (RAM) that stores program instructions and data during operation of the system 100.

The GPU may include hardware and software for display of at least 2D and optionally 3D graphics to the output device 610. The output device 610 may include a graphical or visual display device, such as an electronic display screen, projector, printer, or any other suitable device that reproduces a graphical display. As another example, the output device 610 may include an audio device, such as a loudspeaker or headphone. As yet a further example, the output device 610 may include a tactile device, such as a mechanically raiseable device that may, in an example, be configured to display braille or another physical output that may be touched to provide information to a user.

The input device 612 may include any of various devices that enable the computing device 602 to receive control input from users. Examples of suitable input devices that receive human interface inputs may include keyboards, mice, trackballs, touchscreens, voice input devices, graphics tablets, and the like.

The network devices 608 may each include any of various devices that enable computing device 602 to send and/or receive data from external devices over networks. Examples of suitable network devices 608 include an Ethernet interface, a Wi-Fi transceiver, a cellular transceiver, or a BLUETOOTH or BLE transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for performing sensor fusion for efficient deep learning processing, comprising:
    a computing device of a vehicle having a plurality of seating zones, programmed to
        receive a camera image from an image sensor and a supplemental sensor data from one or more supplemental sensors, the camera image and the supplemental sensor data including imaging of a cabin of the vehicle;
        determine regions of interest in the camera image based on one or more of the camera image or the supplemental sensor data, the regions of interest including areas of the camera image flagged for further image analysis, the determination including to utilize an unactivated region of interest locator to determine the regions of interest in the camera image according to the camera image, and to utilize an activated region of interest locator to determine the regions of interest in the camera image according to the supplemental sensor data;
        utilize a machine-learning model to perform object detection on the regions of interest of the camera image to identify one or more objects in the camera image, including to perform feature extraction on the regions of interest determined using the unactivated region of interest locator and the activated region of interest locator; and
        place the objects into the seating zones of the vehicle.

2. The system of claim 1, wherein the computing device is further programmed to utilize a region of interest locator to determine the regions of interest in the camera image according to the camera image.

3. The system of claim 2, wherein the computing device is further programmed to:
    utilize an occupancy detector to identify three-dimensional (3D) detections of locations of interest within the supplemental sensor data;
    utilize a detection fusion component to fuse two-dimensional (2D) object detection and the 3D detections into fused detections based on a weighted function; and
    perform seat detection using the fused detections.

4. The system of claim 1, wherein the computing device is further programmed to utilize an activated region of interest locator to determine the regions of interest in the camera image according to the supplemental sensor data.

5. The system of claim 4, wherein the supplemental sensor data includes RADAR sensor data indicative of motion of objects within the vehicle.

6. The system of claim 4, wherein the supplemental sensor data includes wireless transceiver data indicative of locations of mobile devices in the vehicle.

7. The system of claim 1, wherein the computing device is further programmed to:

utilize a results fusion to fuse the object detection and the supplemental sensor data into fused detections based on a weighted function; and perform seat detection using the fused detections.

8. A method for performing sensor fusion for efficient deep learning processing, comprising:

receiving a camera image from an image sensor and a supplemental sensor data from one or more supplemental sensors, the camera image and the supplemental sensor data including imaging of a cabin of a vehicle;

determining regions of interest in the camera image based on one or more of the camera image or the supplemental sensor data, the regions of interest including areas of the camera image flagged for further image analysis, including utilizing an unactivated region of interest locator to determine the regions of interest in the camera image according to the camera image and utilizing an activated region of interest locator to determine the regions of interest in the camera image according to the supplemental sensor data;

utilizing a machine-learning model to perform object detection on the regions of interest of the camera image to identify one or more objects in the camera image, including performing feature extraction on the regions of interest determined using both the unactivated region of interest locator and the activated region of interest locator to perform the object detection; and placing the objects into seating zones of the vehicle.

9. The method of claim 8, further comprising:

utilizing an occupancy detector to identify three-dimensional (3D) detections of locations of interest within the supplemental sensor data;

utilizing a detection fusion component to fuse two-dimensional (2D) object detection and the 3D detections into fused detections based on a weighted function; and performing seat detection using the fused detections.

10. The method of claim 8, wherein the supplemental sensor data includes RADAR sensor data indicative of motion of objects within the vehicle.

11. The method of claim 8, wherein the supplemental sensor data includes wireless transceiver data indicative of locations of mobile devices in the vehicle.

12. The method of claim 8, further comprising:

utilizing a results fusion to fuse the object detection and the supplemental sensor data into fused detections based on a weighted function; and performing seat detection using the fused detections.

13. A non-transitory computer-readable medium comprising instructions for performing sensor fusion for efficient deep learning processing that, when executed by a computing device, cause the computing device to perform operations including to:

receive a camera image from an image sensor and a supplemental sensor data from one or more supplemental sensors, the camera image and the supplemental sensor data including imaging of a cabin of a vehicle;

determine regions of interest in the camera image based on one or more of the camera image or the supplemental sensor data, the regions of interest including areas of the camera image flagged for further image analysis, including to utilize an unactivated region of interest locator to determine the regions of interest in the camera image according to the camera image and to utilize an activated region of interest locator to determine the regions of interest in the camera image according to the supplemental sensor data;

utilize a machine-learning model to perform object detection on the regions of interest of the camera image to identify one or more objects in the camera image, including to perform feature extraction on the regions of interest determined using both the unactivated region of interest locator and the activated region of interest locator to perform the object detection; and place the objects into seating zones of the vehicle.

14. The medium of claim 13, further comprising instructions that, when executed by the computing device, cause the computing device to perform operations including to:

utilize an occupancy detector to identify three-dimensional (3D) detections of locations of interest within the supplemental sensor data;

utilize a detection fusion component to fuse two-dimensional (2D) object detection and the 3D detections into fused detections based on a weighted function; and perform seat detection using the fused detections.

15. The medium of claim 13, wherein the supplemental sensor data includes one or more of (i) RADAR sensor data indicative of motion of objects within the vehicle, or (ii) wireless transceiver data indicative of locations of mobile devices in the vehicle.

16. The medium of claim 13, further comprising instructions that, when executed by the computing device, cause the computing device to perform operations including to:

utilize a results fusion to fuse the object detection and the supplemental sensor data into fused detections based on a weighted function; and perform seat detection using the fused detections.

* * * * *